United States Patent [19]

Ewen et al.

[11] Patent Number: 5,476,914
[45] Date of Patent: Dec. 19, 1995

[54] SYNDIOTACTIC POLYPROPYLENE

[75] Inventors: John A. Ewen, Houston, Tex.; Abbas Razavi, Paturages, Belgium

[73] Assignee: Fina Technology, Inc., Dallas, Tex.

[21] Appl. No.: 854,150

[22] Filed: Mar. 20, 1992

Related U.S. Application Data

[63] Continuation-in-part of Ser. No. 220,006, Jul. 15, 1988, abandoned.

[51] Int. Cl.$^6$ ........................................... C08F 10/06
[52] U.S. Cl. ........................................... 526/351; 526/160
[58] Field of Search ................................. 526/351

[56] References Cited

U.S. PATENT DOCUMENTS

| | | | |
|---|---|---|---|
| 3,258,455 | 6/1966 | Natta et al. | 526/351 |
| 3,268,627 | 8/1966 | Emrick | 526/351 |
| 3,305,538 | 2/1967 | Natta et al. | 526/351 |
| 3,364,190 | 1/1968 | Emrick | 526/351 |
| 4,411,821 | 10/1983 | Howard, Jr. | 502/117 |
| 4,497,906 | 2/1985 | Hanji et al. | 502/110 |
| 4,522,982 | 6/1985 | Ewen | 526/351 |
| 4,530,914 | 7/1985 | Ewen et al. | 502/113 |
| 4,542,199 | 9/1985 | Kaminsky et al. | 526/160 |
| 4,841,009 | 6/1989 | Kaminsky et al. | 526/160 |
| 4,849,487 | 7/1989 | Kaminsky et al. | 526/160 |
| 4,892,851 | 1/1990 | Ewen et al. | 526/160 |

FOREIGN PATENT DOCUMENTS

| | | |
|---|---|---|
| 50436 | 6/1985 | Australia . |
| 0128046 | 12/1984 | European Pat. Off. . |
| 0129368 | 12/1984 | European Pat. Off. . |
| 0185918 | 7/1986 | Germany . |
| WO870299 | 5/1987 | WIPO . |
| WO8703604 | 6/1987 | WIPO . |

OTHER PUBLICATIONS

"Stereochemical Aspects on the Secondary Insertion of Propene Monomer into Vanadium–Polymer Bond", Doi et al, Makromol. Chem., vol. 186, No. 12, pp. 2529–2533 (1985).

"Effects of Chain Defects on the Morphology and Thermal Behavior of Solution–Grown Single Crystals of Syndiotactic Polypropylene", Marchetti et al, J. of Polym. Sci., Polym. Phys. Ed., vol. 12, No. 8, pp. 1649–1666 (1974).

"Correlation Between Regio–and Syndiotactic Specificity of Soluble Vanadium–Based Catalysts for Propene Polymerization", Doi, Macromolecules, vol. 12, No. 5, pp. 1012–1013 (1979).

"Polymerization of Propylene to Syndiotactic Polymer", Zambelli et al, Macromolecules, vol. 7, No. 6, pp. 750–751 (1974).

"Crystal Structure and Morphology of Syndiotactic Polypropylene Single Crystals" Lotz et al Macromolecules, vol. 21, No. 8, pp. 2375–2382 (1988).

"Sequence Distributions of Inverted Propylene Units in Polypropylenes Measured by Carbon—NMR", Doi Macromolecules, vol. 12, No. 2, pp. 248–251 (1979).

John A. Ewen, "Mechanisms of Stereochemical Control in Propylene Polymerizations with Soluble Group 4B Metallocene/Methylalumoxane Catalysts" Mar. 12, 1984, pp. 6355–6364.

John A. Ewen, "Ligand Effects on Metallocene Catalyzed Ziegler–Natta Polymerizations", published by Elsevier Publishing Co. Apr. 26, 1986, pp. 271–292.

*Primary Examiner*—Edward J. Smith
*Attorney, Agent, or Firm*—Jim D. Wheelington; M. Norwood Cheairs

[57] ABSTRACT

The invention provides for highly crystalline syndiotactic polypropylene comprising a high percentage of racemic (r) dyads. The high crystallinity may be due to the polymerization mechanism of metallocene catalysts of a particular structure which appear to produce syndiotactic polypropylene of a new microstructure.

4 Claims, 5 Drawing Sheets

SYNDIOTACTIC POLYPROPYLENE

This is a continuation-in-part of application Ser. No. 07/220,006 filed on Jul. 15, 1988, now abandoned.

BACKGROUND OF THE INVENTION

1. Field of the Invention

The invention relates to highly crystalline syndiotactic polypropylene and, particularly, to syndiotactic polypropylene having a syndiotactic index of greater than 75%.

2. Description of the Prior Art

As known in the art, syndiotactic polymers have a unique stereochemical structure in which monomeric units having enantiomorphic configuration of the asymmetrical carbon atoms follow each other alternately and regularly in the macromolecular main chain. Syndiotactic polypropylene was first disclosed by Natta et al, in U.S. Pat. No. 3,258,455. The Natta group obtained syndiotactic polypropylene by using a catalyst prepared from titanium trichloride and diethyl aluminum monochloride. A later patent to Natta et al, U.S. Pat. No. 3,305,538, discloses the use of vanadium triacetylacetonate or halogenated vanadium compounds in combination with organic aluminum compounds for producing syndiotactic polypropylene. U.S. Pat. No. 3,364,190 to Emrick discloses a catalyst system composed of finely divided titanium or vanadium trichloride, aluminum chloride, a trialkyl aluminum and a phosphorus-containing Lewis base as producing syndiotactic polypropylene.

As disclosed in these patent references and as known in the art, the structure and properties of syndiotactic polypropylene differ significantly from those of isotactic polypropylene. The isotactic structure is typically described as having long sequences of monomer units with the same relative configuration of the tertiary carbon atoms. Using the Fischer projection formula, the stereochemical sequence of isotactic polypropylene is described as follows:

The methyl groups attached to the tertiary carbon atoms of successive monomeric units on the same side of a hypothetical plane through the main chain of the polymer, e.g., the methyl groups are all above or below the plane.

Another way of describing the structure is through the use of NMR. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

In contrast to the isotactic structure, syndiotactic polymers are those in which long sequences of monomer units have an alternating relative configuration of the tertiary carbon atoms. Using the Fischer projection formula, the structure of a syndiotactic polymer is designated as:

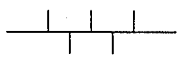

The methyl groups attached to the tertiary carbon atoms of successive monomeric units in the chain lie on alternate sides of the plane of the polymer.

In NMR nomenclature, this pentad is described as . . . rrrr . . . in which each "r" represents a "racemic" dyad, i.e., successive methyl groups on alternate side of the plane. The percentage of r dyads in the chain determines the degree of syndiotacticity of the polymer. Syndiotactic polymers are crystalline and like the isotactic polymers are insoluble in xylene. This crystallinity distinguishes both syndiotactic and isotactic polymers from atactic polymer that is soluble in xylene. Atactic polymer exhibits no regular order of repeating unit configurations in the polymer chain and forms essentially a waxy product.

While it is possible for a catalyst to produce all three types of polymer, it is desirable to produce predominantly isotactic or syndiotactic polymer with very little atactic formed. Catalysts that produce isotactic polyolefins are disclosed in European Patent Application No. 87870132.5 (Publication No. 0 284 308) published Oct. 5, 1988 and U.S. Pat. Nos. 4,794,096 issued Dec. 27, 1988 and 4,975,405 issued Dec. 4, 1990. These applications disclosed chiral, stereorigid metallocene catalysts that polymerize olefins to form isotactic polymers and are especially useful in the polymerization of a highly isotactic polypropylene. The present invention, however, utilize a different class of metallocene catalyst that are useful in the polymerization of syndiotactic polyolefins, and more particularly syndiotactic polypropylene.

The present invention provides highly crystalline syndiotactic polypropylene. It was discovered that the catalyst structure affected the formation of a syndiotactic polymer as opposed to an isotactic polymer. One theory, without limiting the scope of the claims of the present invention, is that the catalyst structure appears to affect the type and number of deviations in the chain from the principally repeating units in the polymer. Previously, the catalyst used to produce syndiotactic polypropylene were believed to exercise chain-end control over the polymerization mechanism. These previously known catalysts, such as the ones disclosed by Natta et al in the references cited above, produce syndiotactic polymers which primarily have the following structure:

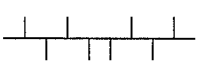

or in NMR nomenclature . . . rrrmrrr . . . The NMR analysis for this structure of syndiotactic polypropylene is shown in Zambelli, et al., *Macromolecules,* Vol. 13, pp 267–270 (1980). Zambelli's analysis shows the predominance of the single meso dyad over any other deviations in the chain.

SUMMARY OF THE INVENTION

The present invention provides syndiotactic polypropylene having a high syndiotactic index. The highly crystalline syndiotactic polypropylene is obtained through use of a stereorigid metallocene compound described by the formula

wherein $(C_5R_4)$ is a cyclopentadienyl ring or substituted cyclopentadienyl ring; $(C_4R'_m C_5 C_4 R'_n)$ is a substituted cyclopentadienyl ring, preferably a fluorenyl radical; each R and R' is hydrogen or hydrocarbyl radical having from 1–20 carbon atoms, a halogen, an alkoxy, and alkoxy alkyl or an alkylamino radical, each R and R' may be the same or different; $(C_5R_4)$ has bi-lateral or pseudo bi-lateral symmetry for the proximal carbon atoms and bi-lateral symmetry only for the distal carbon atoms, "proximal" referring to position 2 or 5 of the cyclopentadienyl rings and "distal" referring to position 3 or 4 of the cyclopentadienyl ring relative to the carbon attached to R" (position 1), i.e., proximal being near the bridgehead carbon and distal being away from the bridgehead carbon; R" is a structural bridge between the ($C_5R_4$) and ($C_4R'_4C_5C_4R'_4$) rings to impart stereorigidity and, preferably, is a hydrocarbyl radical having 1–4 carbon atoms, a silicon hydrocarbyl compound, agermanium hydrocarbyl compound, an alkyl phosphine, an alkyl amine, a boron compound or an aluminum compound and may be unsubstituted or substituted with hydrocarbyl groups, such as an alkyl, aryl, alkylaryl or arylalkyl radical, to form the bridge; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; and p is the valence of Me minus 2. It was discovered that the use of a metallocene catalyst as described above product highly crystalline syndiotactic polypropylene.

The highly crystalline syndiotactic polypropylene is obtained by introducing at least one of the compounds described by the above formula with a cocatalyst or ionizing agent, such as alumoxane, into a polymerization reaction zone containing propylene monomer. In addition, an electron donor compound, such as an organosilicon compound and/or a scavenging agent, such as an aluminum alkyl, may be introduced into the reaction zone. Further, the catalyst may also be pre-polymerized prior to introducing it into the reaction zone and/or prior to the stabilization of reaction conditions in the reactor. The prepolymerization of the catalyst system can occur by contacting the metallocene compound with a small amount of the cocatalyst or ionizing agent and an olefin monomer at a temperature below that at which polymerization occurs in the reaction zone.

BRIEF DESCRIPTION OF THE DRAWINGS

FIG. 1 specifically shows isopropyl(cyclopentadienyl)(fluorenyl) hafnium dichloride.

FIG. 2 specifically shows isopropyl (cyclopentadienyl)(fluorenyl)zirconium dichloride.

DETAILED DESCRIPTION OF THE INVENTION

Figure 1:
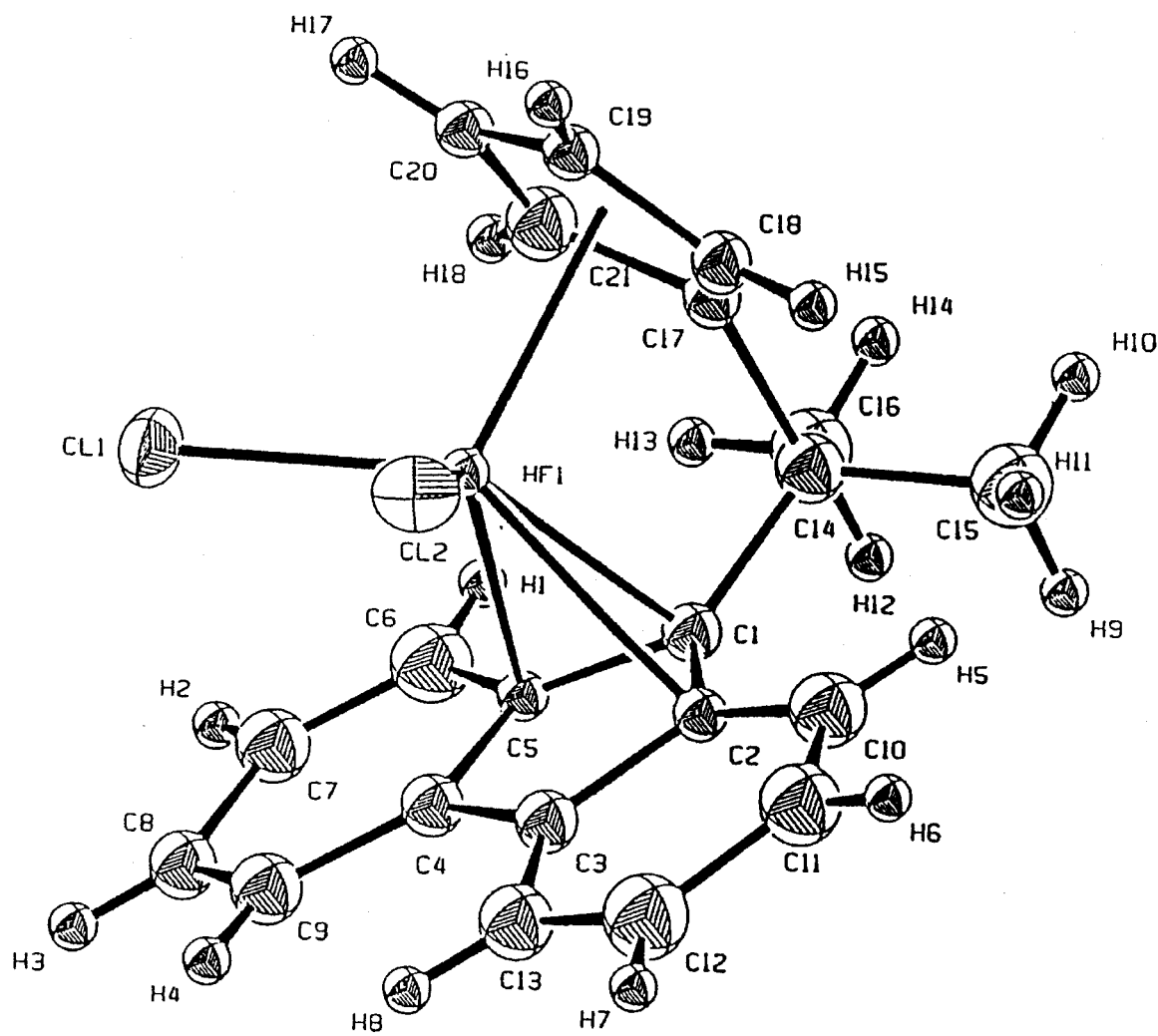
FIG. 1 is an illustration of the structure of a catalyst useful in producing highly crystalline syndiotactic polyolefins.

The present invention provides highly crystalline polypropylene. The polymer consists of a high percentage of racemic dyads, i.e., greater than 75%.

When propylene or other alpha-olefins are polymerized using a catalyst consisting of a transition metal compound, the polymer product typically comprises a mixture of amorphous atactic and crystalline xylene insoluble fractions. The crystalline fraction may contain either isotactic or syndiotactic polymer, or a mixture of both. Highly iso-specific metallocene catalysts are disclosed in European Patent Application No. 87870132.5 (Publication No. 0 284 708) published Oct. 5, 1988 and U.S. Pat. Nos. 4,794,096 issued Dec. 27, 1988, and 4,975,405 issued Dec. 4, 1990. In contrast to the catalysts disclosed in those applications, the catalysts useful in producing the polymers of the present invention are syndio-specific and produce a polymer with a high syndiotactic index. Some of these catalyst are disclosed in U.S. Pat. No. 4,892,451. It was discovered that syndiotactic polypropylene has lower heats of crystallization than the corresponding isotactic polymers. It has been discovered that the catalysts disclosed in U.S. Pat. No. 4,892,451 appear to produce a polymer with a different microstructure than that previously known. These new catalysts produce syndiotactic polymers which are believed to primarily have the following structure:

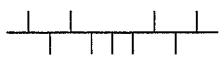

or in NMR nomenclature . . . rrrmmmrrr . . .

The polymerization mechanism of these catalysts produces polymer having a high percentage of racemic dyads in the structure and is known to be an enantiomorphic site control mechanism, different from the previously known chain-end control mechanism.

In the prior art, Lotz et al, (Macromol, 2378 (1988)) obtained polymer with a syndiotactic dyad fraction of [r]= 0.769, which was produced in heptane solvent and precipitated in methanol. Doi et al (Macromol, 12, 248 (1979)) obtained a polymer whose [rr]-value was as high as 0.76, which was produced in heptane solvent and repeatedly washed by ethyl alcohol. The highest [r]-value by Doi was reported as 0.81 (Makromol. Chem., 186, 2529 (1985). Zambelli et al., (Macromolecules, 7, 750 (1974)) reported [rrrr]-value as high as 0.51, which was produced in toluene, had syrupy consistency, coagulated and precipitated with excess methanol [J. Polymer Sci.(pt-C 4, 411 (1963))].

As for the solubility of syndiotactic polypropylene in hydrocarbons, Natta succeeded in separating syndiotactic polypropylene from the mixture consisting of amorphous, isotactic and syndiotactic portions by solution chromatography, adopting highly crystalline and high molecular weight isotactic polypropylene as absorbent, and then eluting with isoPr$_2$O, n-hexane and n-heptane, successively, under somewhat below boiling temperature (Atti accad. Nazl. lincei Rend, class Sci. Fis.Mat.Nat., 28, 539 (1960)). Marchetti et al., obtained solution-grown single crystals of syndiotactic polypropylene from a dilute solution of hydrocarbons. (J. Polymer Sci., Polymer Physics ed., 12, 1649 (1974). Dissolution temperature of syndiotactic polypropylene are reported 36.5° C. for n-hexane, 38.5°–46° C. for n-heptane, and crystallization temperature is 0° C. for hexane and heptane. (No data are reported as to the result from n-dodecene grown crystals). There is no disclosure in the prior art that syndiotactic polypropylene is soluble in cold (0° C.) xylene.

The metallocene catalyst of the present invention may be described by the formula:

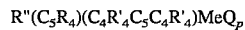

wherein ($C_5R_4$) is a substituted or unsubstituted cyclopentadienyl ring; ($C_4R'_mC_5C_4R'_n$) is a substituted cyclopentadienyl ring preferably a fluorenyl radical; each R and R' is hydrogen or hydrocarbyl radical having from 1–20 carbon atoms, a halogen, an alkoxy, and alkoxy alkyl or an alkylamino radical, each R and R' may be the same or different;

($C_5R_4$) has bi-lateral or pseudo bi-lateral symmetry for the proximal carbon atoms and bi-lateral symmetry only for the distal carbon atoms, "proximal" referring to position 2 or 5 of the cyclopentadienyl rings and "distal" referring to position 3 or 4 of the cyclopentadienyl ring relative to the carbon attached to R" (position 1), i.e., proximal being near the bridgehead carbon and distal being away from the bridgehead carbon; R" is structural bridge between the ($C_5R_4$) and ($C_4R'_4C_5C_4R'_4$) rings to impart stereorigidity and, preferably is a hydrocarbyl radical having 1–4 carbon atoms, a silicon hydrocarbyl compound, a germanium hydrocarbyl compound, an alkyl phosphine, an alkyl amine, a boron compound or an aluminum compound and may be unsubstituted or substituted with hydrocarbyl groups, such as an alkyl, aryl, alkylaryl or arylalkyl radical, to form the bridge, e.g., R" may be n-propyl or isopropyl in that it can be three linear carbon atoms or one branched carbon atom with methyl groups attached; Q is a hydrocarbyl radical such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; and p is the valence of Me minus 2. The structure of the metallocene compound is given below:

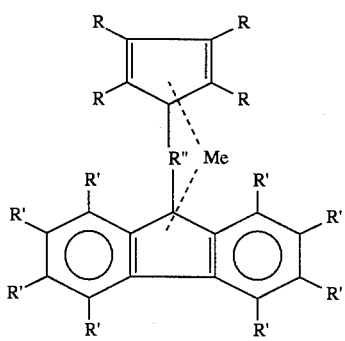

In order to be syndio-specific, it was discovered that the $C_5R_4$ ring in the metallocene compound must have bi-lateral or pseudo bi-lateral symmetry for the proximal carbon atoms and bi-lateral symmetry only for the distal carbon atoms. Proximal refers to position 2 or 5 of the cyclopentadienyl rings and distal refers to position 3 or 4 of the cyclopentadienyl ring relative to the carbon attached to R" as shown below.

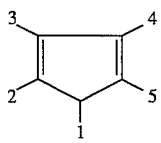

Proximal carbon atoms are those near the bridgehead carbon and distal carbon atoms are those away from the bridgehead carbon.

Bilateral symmetry is defined as the condition in which there is no substituents or one or moire substituents on one side and no substituents or one or more substituents on the other side in the same relative position such that a mirror image is formed from one side to another. One example of such a compound is isopropyl (cyclopentadienyl-1-fluorenyl)zirconium dichloride, abbreviated iPr[Cp(Flu)]ZrCl$_2$. An illustration of the ligands of this compound are shown below:

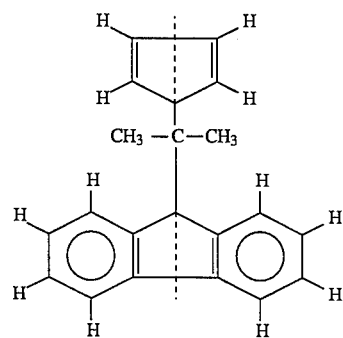

Bilateral symmetry is illustrated by the ligands having their right side being a mirror image of their left side.

Pseudobilateral symmetry is defined as symmetry such that a mirror image exists from one side to the other in regard to the existence and position of substitutents but the substitutents themselves are not identical. This is illustrated below:

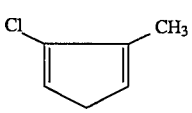

Pseudobilateral symmetry is illustrated by the substituents being in the same relative position, i.e., forming a mirror image as to location of substituents on the cyclopentadienyl ring, but the substituents are not the same.

Figure 2:
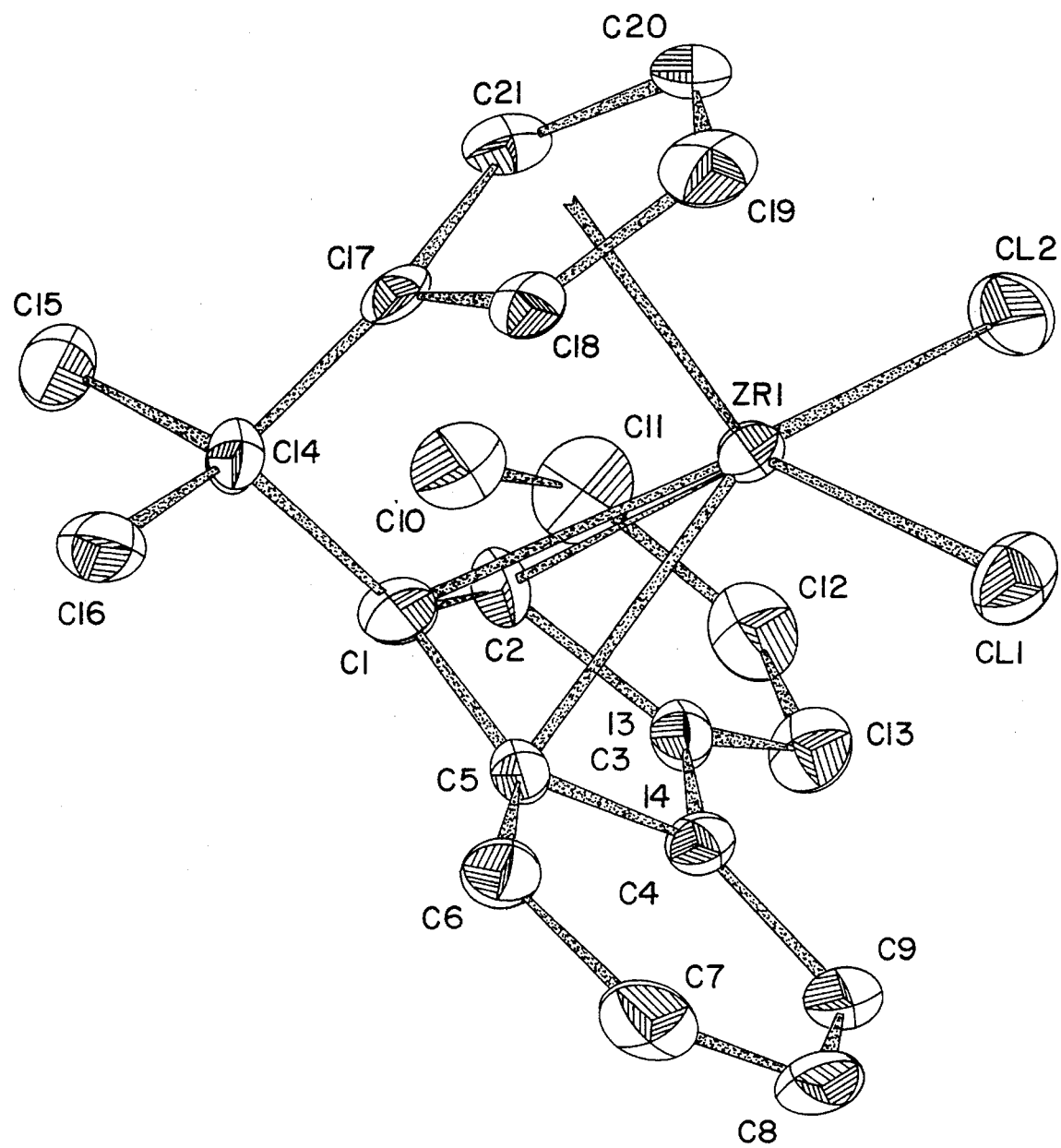
FIG. 2 is an illustration of the structure of the preferred catalyst useful in producing highly crystalline syndiotactic polyolefins.

In a preferred catalyst useful in producing polymers of the present invention ($C_5R_4$) is preferably cyclopentadienyl ($C_5H_4$), ($C_4R'_4C_5C_4R'_4$) is preferably fluorenyl ($C_4H_4C_5C_4H_4$), Me is preferably titanium, zirconium or hafnium; R" is preferably isopropyl; Q is preferably a halogen, and, most preferably, chlorine; and p is preferably 2. FIG. 1 shows the structure of a iso-propyl (fluorenyl)(cyclopentadienyl)hafnium dichloride. The zirconium analogue of the catalyst shown in FIG. 2 is preferred.

The catalyst may be prepared by any method known in the art. U.S. Pat. No. 4,892,451, hereby incorporated by reference, discloses two methods of preparing the catalyst with the second method being preferred as it produces a more stable and active catalyst. It is important that the catalyst complex be "clean" as the purity will affect the molecular weight and structure of the polymer produced. Generally, the preparation of the catalyst complex consists of forming and isolating the Cp or substituted Cp ligands which are then reacted with a halogenated metal to form the complex.

The metallocene catalysts of the present invention are useful in many of the polymerization processes known in the art including many of those disclosed for the preparation of isotactic polypropylene. When the catalyst of the present invention are used in these types of processes, syndiotactic polymers are produced rather than isotactic polymers. Further examples of polymerization processes useful in the preparation of polymers described by the present invention include those disclosed in U.S. Pat. Nos. 4,767,735 issued on Aug. 20, 1988, and 4,975,403 issued Dec. 4, 1990, the disclosures of which are hereby incorporated by reference. These preferred polymerization procedures include the step of prepolymerizing the catalyst.

Consistent with the prior disclosures of metallocene catalysts for the production of isotactic polymers, the catalysts of the present invention are particularly useful in combination with an aluminum cocatalyst, preferably an alumoxane, an alkyl aluminum, or a mixture thereof. In addition, a complex may be isolated between a metallocene catalyst as described herein and an excess amount of aluminum cocatalyst in accordance with the teachings of European Patent Publication No. 226,463 published on Jun. 24, 1987 assigned to Exxon Chemical Patent Inc. with Howard Turner listed as the inventor. The alumoxanes useful in combination with the catalysts of the present invention may be represented by the general formula (R—Al—O—) in the cyclic form and R(R—Al—O)$_n$—ALR2 in the linear form wherein R is an alkyl group with one to five carbon atoms and n is an integer from 1 to about 20. Most preferably, R is a methyl group.

The Examples given below illustrate the present invention and its various advantages and benefits in more detail. The catalyst is iso-propyl(fluorenyl) (cyclopentadienyl) zirconium dichloride or iso-propyl(fluorenyl) (cyclopentadienyl) hafnium dichloride depending on the example. FIG. 1 shows the structure of the hafnium catalyst. The zirconium catalyst shown in FIG. 2 has essentially the same structure with Zr positioned in the place of the Hf atom.

The Examples below illustrate the preparation of the polymers of the present invention and its various advantages in more detail. The results of the polymerization process and the analysis of the polymer are shown in Table 1 for Examples 1–17 and Table 2 for Examples 18–33.

EXAMPLE 1

The polymerization of propylene was carried out using 0.16 mg of isopropyl(cyclopentadienyl)(fluorenyl) zirconium dichloride produced in accordance with Method A us U.S. Pat. No. 4,892,451. The catalyst was purified using fractional recrystallization. The catalyst was precontacted for 20 minutes with a toluene solution containing 10.7% by weight of methylalumoxane (MAO) with an average molecular weight of about 1300. The alumoxane serves as a co-catalyst in the polymerization reaction. Ten cc of the MAO solution was used in the polymerization. The catalyst and cocatalyst solution was then added to a Zipperclave reactor at room temperature followed by the addition of 1.2 liters of liquid propylene. The reactor contents were then heated to the polymerization temperature, T as shown in Tables 1 and 2, of 20° C. in less than about 5 minutes. During this time, prepolymerization reaction was allowed to run for 60 minutes during which time the reactor was maintained at the polymerization temperature. The polymerization was terminated by rapidly venting the monomer. The reactor contents were washed with 50% methanol in dilute HCl solution and dried in vacuo. The polymerization yielded 14 gms of polypropylene "as polymerized" i e. without any further isolations or purification.

Analysis of Polymer

The polymer was analyzed to determine the melting point Tm, the heat of crystallization Hc, the molecular weights ($M_p$, $M_w$, and $M_n$) and the syndiotactic index. Unless otherwise noted, the analyses were performed on the xylene insoluble fraction of the polymer which includes the syndiotactic fraction and any isotactic polymer produced. The atactic polymer was removed by dissolving the polymer product in hot xylene, cooling the solution to 0° C. and precipitating out the xylene insoluble fraction. Successive recrystallization performed in this manner result in removing essentially all atactic polymer from the xylene insoluble fraction.

The melting points, Tm, were derived using Differential Scanning Calorimetry (DSC) data as known in the art. The melting points, Tm1 and Tm2 listed in Tables 1 and 2 are not true equilibrium melting points but are DCS peak temperatures. In syndiotactic polypropylene, it is not unusual to get an upper and a lower peak temperature, i.e., two peaks, and both melting points are reported in Tables 1 and 2 with the lower melting point reported as Tm1 and the higher point as Tm2. True equilibrium melting points obtained over a period of several hours would most likely be several degrees higher than the DSC lower peak melting points. As is known in the art, the melting points for polypropylene are determined by the crystallinity of the xylene insoluble fraction of the polymer. This has been shown to be true by running the DSC melting points before and after removal of the xylene soluble or atactic form of the polymer. The results showed only a difference of 1°–2° C. in the melting points after most of the atactic polymer was removed. As shown in Table 1, the melting points were determined to be 145° C. and 150° C. for the polymer produced in Example 1. DSC data was also used to determine the heat of crystallization, —Hc as shown in Tables 1 and 2 measured in J/g. The melting points and —Hc were determined on the "as polymerized" sample before the atactic polymer was removed.

The molecular weights of the polymer were calculated using Gel Permeation Chromatography (GPC) analysis done on a Waters 150C instrument with a column of Jordi gel and an ultra-high molecular weight mixed bed. The solvent was trichlorobenzene and the operating temperature was 140° C. From GPC, $M_p$ which is the peak molecular weight, $M_n$ which is the number average molecular weight, and $M_w$ which is the weight average molecular weight were derived for the xylene insoluble fraction of the polymer produced. The molecular weight distribution, MWD, is commonly measured as $M_w$ divided by $M_n$. The values determined for this sample are shown in Table 1.

The syndiotactic index can be determined from GPC, IR or NMR data. The syndiotactic index is calculated from NMR data according to the following equation:

$$Syndiotactic\ index = rrrr + mrrr + mrrm + \tfrac{1}{2}(mrmr + mmrm + rrmr + mmrr)$$

The syndiotactic index obtained from NMR data is the most accurate indication of the degree of syndiotacticity. The syndiotactic index based on IR data is calculated by dividing the area of the IR peak at 11.53 microns by half of the area of the peaks at 2.32 and 2.35 microns represented by the following formula:

$$Syndiotactic\ index = A_{11.53}/\tfrac{1}{2}(A_{2.32} + A_{2.35})$$

The syndiotactic index calculated from GPC data requires that the syndiotacticity of the syndiotacticity of the polymer be known beforehand. Unlike NMR and IR data, GPC data cannot show the tacticity of the polymer, i.e., whether a polymer is isotactic, or syndiotactic. The tacticity must be determined by other methods, such as IR or NMR, before the syndiotactic index (or isotactic index) of the polymer can be calculated from GPC data. The syndiotactic index is calculated as the area of the GPC peak related to the crystalline polymer divided by the total GPC peak area for the polymer "as polymerized" represented by the following formula:

$$Syndiotactic\ index = A_{crystalline}/A_{Total} \times 100$$

The syndiotactic index shown in Table 1 was determined from the GPC data. The syndiotactic index shown in Table 2 was determined from NMR data on samples which were recrystallized from xylene.

Figure 3:
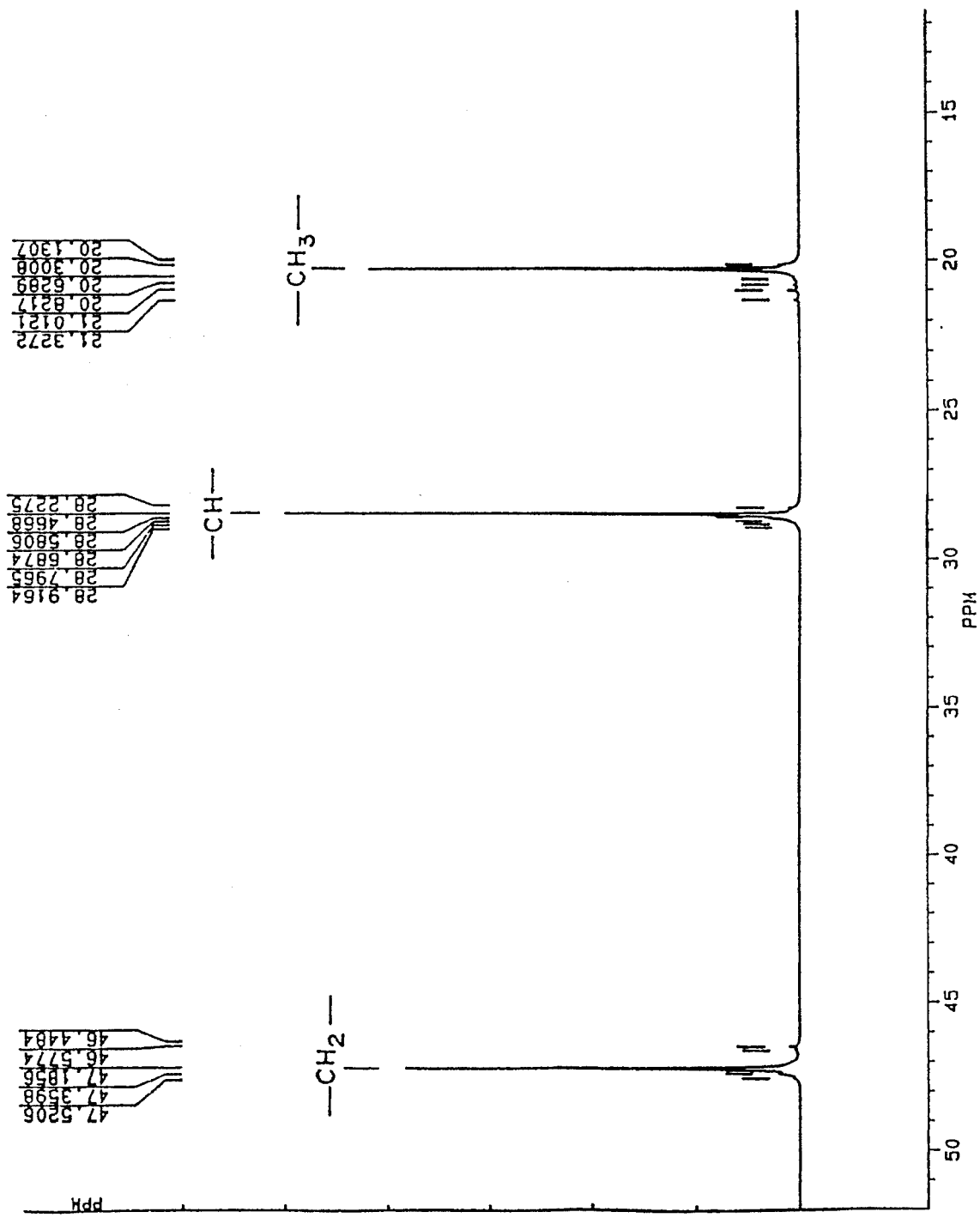
FIG. 3 is an NMR spectra for the polymer produced in Example 1 with the polymer being recrystallized once from xylene.

NMR analysis was used to determine the microstructure of the polymer. A sample of the polymer produced above was dissolved in a 20% solution os 1,2,4-trichlorobenzene/ $d_6$-benzene and run on a Bruker AM 300 WB spectrometer using the inverse gate broad band decoupling method. The experimental conditions were: transmitter frequency 75.47 Mhz; decoupler frequency 300.3 Mhz; pulse repetition time 12 seconds; acquisition time 1.38 seconds; pulse angle 90° (11.5 microseconds pulse width); memory size 75K points; spectral window, 12195 Hz. Seven thousand transients were accumulated, and the probe temperature was set at 133° C. The NMR spectrum for the polymer produced and recrystallized from xylene one time is shown in FIG. 3. The calculated and observed values for the spectrum are shown in Table 3 with Example 1 representing the data for the sample recrystallized once from xylene and Example 1-A representing the data for the sample recrystallized three times from xylene. The calculated values were derived using the Bernouillian probability equations as disclosed in Inoue Y., et al, *Polymer*, Vol. 25, page 1640 (1984) and as known in the art.

The results show that in the sample recrystallized once from xylene the percentage of racemic dyads (r) is 95%. For the sample recrystallized three times from xylene the percentage of r dyads is 98% indicating a polymer that consists of 2% or less of the meso (m) dyad. Further, the NMR spectrum shows that the meso dyads occur predominately in pairs, i.e., mm triads, as opposed to the previously known single m dyad structure in the chain. The data in Table 3 establishes that the polymer does have a novel microstructure.

EXAMPLE 2

The procedures of Example 1 were repeated except that 500 ml of toluene was used as a co-solvent in the polymerization reaction. Further, one gram of MAO was used in the polymerization, and the reaction temperature was 50° C. Fifteen grams of oil were obtained along with the polymer product. The polymer was analyzed in accordance with the procedures given above and the results are shown in Table 1.

EXAMPLE 3

The procedures of Example 2 were repeated except that hafnium was used as the transition metal in the catalyst. The other reaction conditions were as shown in Table 1, and the analyzed properties of the resulting polymer are also shown in Table 1.

EXAMPLES 4 THROUGH 8

The procedures of Example 1 were repeated except for the differing reaction conditions as shown in Table 1. In addition, Example 4 used chromatography as the purification procedure and Example 5 utilized no purification procedure. The results of the polymerization and the analysis of the polymer are shown in Table 1.

Figure 4A:
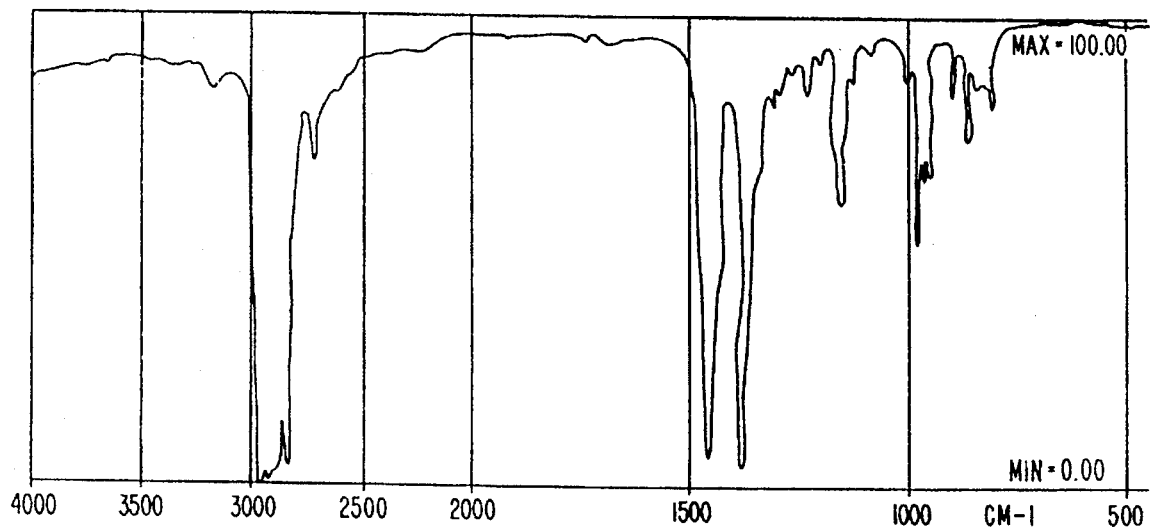
FIGS. 4 and 5 are IR spectra for the polymers produced in Examples 7 and 8 respectively with the polymer being recrystallized three times from xylene.
Figure 4B:
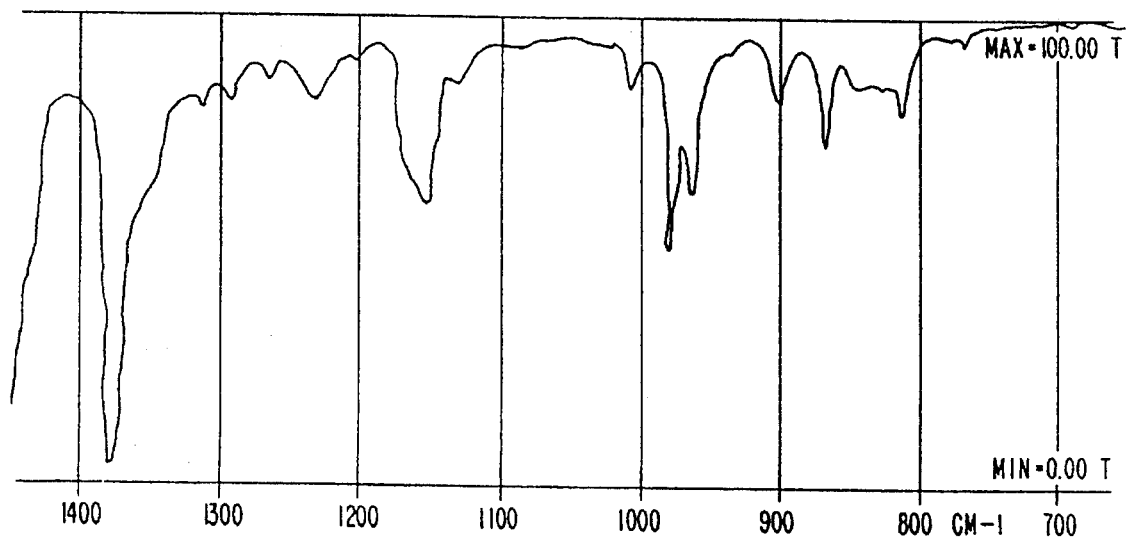
Figure 5A:
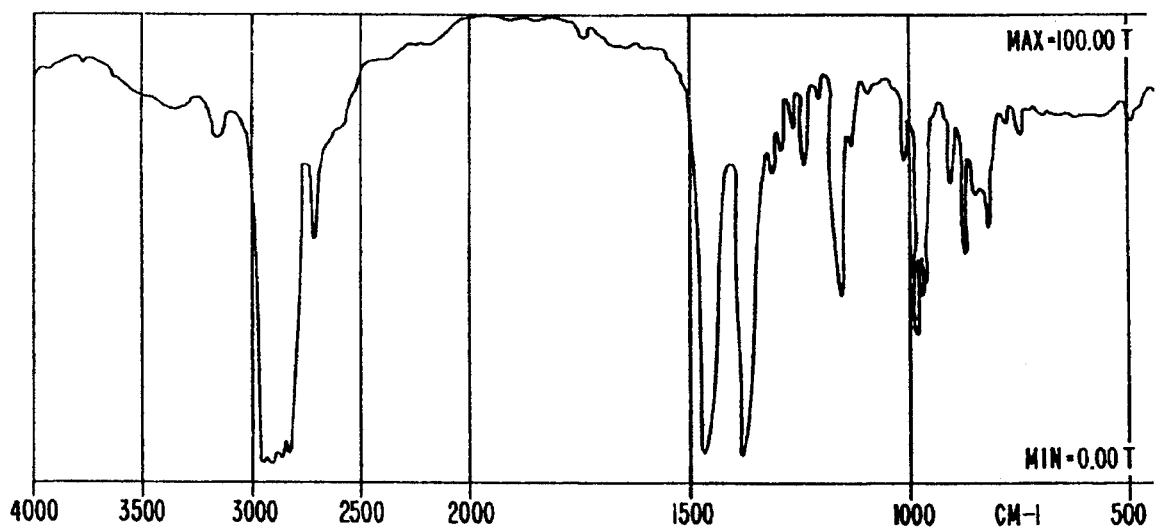
Figure 5B:
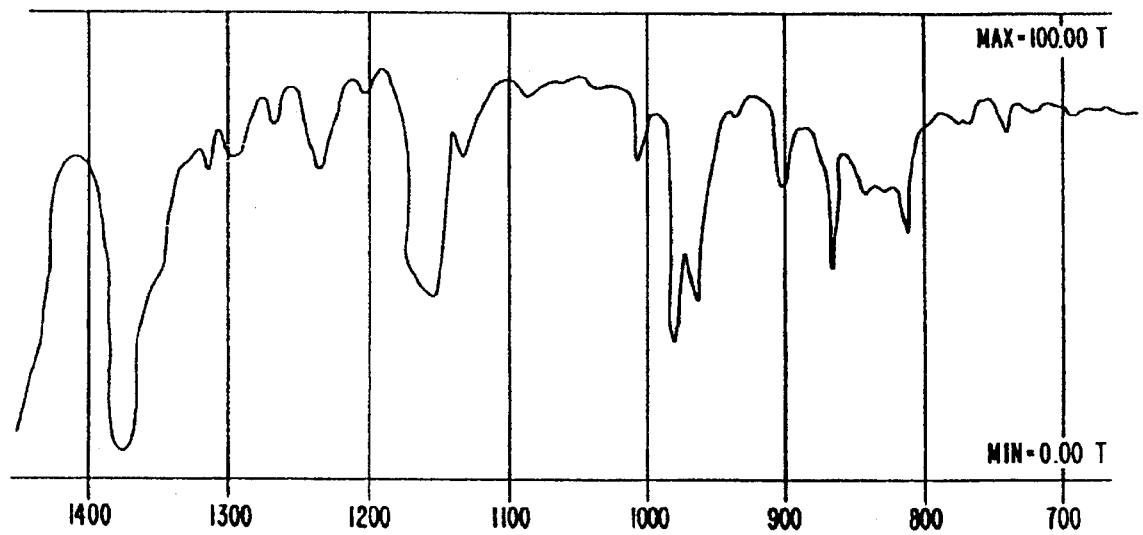

FIGS. 4 and 5 show the IR spectra for the polisher produced in Examples 7 and 8 respectively. The characteristic bands at 977 and 962 $cm^{-1}$ for syndiotactic polypropylene are readily visible. The presence of these bands reaffirm the syndiotactic structure of the polymer. The corresponding bands for isotactic polypropylene are 995 and 974 respectively.

EXAMPLES 9 THROUGH 16

The procedures of Example 1 were repeated except for the changes in the amounts of catalyst and co-catalyst as indicated in Table 1. Further, the catalysts in Examples 9–13 and 15 were purified using both extraction with pentane and fractional recrystallization. Example 14 used extraction with pentane and chromatography as the purification procedures. Example 16 did not use any purification procedure.

EXAMPLE 17

The procedures of Example 1 were repeated except that hafnium was used as the transition metal for the catalyst. The other reaction conditions were as shown in Table 1. The catalyst was purified using extraction with pentane and fractional recrystallization. The results of the polymerization are shown in Table 1.

EXAMPLES 18 and 19

A hafnium metallocene catalyst was synthesized using Method B of U.S. Pat. No. 4,892,451 and using the 95% pure $HfCl_4$ that contained about 4% $ZrCl_4$. The polymerization was carried out using the polymerization procedures of Example 1 under the conditions shown in Table 2. The polymers were analyzed in accordance with the procedures set forth in Example 1 and the results are shown in Table 2.

EXAMPLES 20 THROUGH 31

A zirconium metallocene catalyst was prepared using the synthesis procedures of Method B of U.S. Pat. No. 4,892, 451 and the polymerization of propylene was carried out under the conditions shown for each Example in Table 2. The polymer products were analyzed in accordance with the procedures of Example 1 and the results are given in Table 2. It should be noted that for Examples 20–22, the syndiotactic index was determined for the xylene insoluble fraction. The syndiotactic index for these fractions were nearly 100%. The observed (obsd.) NMR spectra data for Examples 20 and 22 are shown in Table 4. The data given for Examples 20 and 22 was collected from the polymers produced in Examples 20 and 22 respectively and recrystallized once from xylene. Example 22-A is the polymer of Example 22 that is recrystallized three times from xylene.

EXAMPLES 32–33

A hafnium metallocene catalyst was prepared using the synthesis procedure of Method B of U.S. Pat. No. 4,892,851. The catalyst for Example 32 was prepared using the 99% pure. $HfCl_4$ while the catalyst in Example 33 was prepared from the 95% pure $HfCl_4$ that contained about 4% $ZrCl_4$. The polymerization was carried out in accordance with the procedures of Example 1 under the conditions shown for Examples 32 and 33 in Table 2. The results of the analysis of the polymer produced in these Examples are also shown in Table 2. The NMR data for Example 33 is shown in Table 4 with the sample as recrystallized once from xylene (Ex. 33) and three times from xylene (Ex. 33A).

TABLE 1

Method A

| Example | Metal | Catalyst (mg) | MAO (cc) | T (°C.) | Yield (g) | Tm1° (C.) | Tm2 (°C.) | −Hc J/g | $M_p$/1000 | $M_w/M_n$ | S.I. % |
|---|---|---|---|---|---|---|---|---|---|---|---|
| 1 | Zr | 10.0 | 10.0 | 20 | 14 | 145 | 150 | 43 | 118 | 2.5 | 62 |
| 2 | Zr | 10.3 | 1 g | 50 | 26 | 129 | 137 | 45 | 57 | 1.9 | 68 |
| 3 | Hf | 10.3 | 1 g | 50 | 12 |  | 104 | 17 | 1222 |  | 46 |
| 4 | Zr | 5.0 | 10.0 | 50 | 130 | 132 | 138 | 37 | 61 |  | 87 |
| 5 | Zr | 5.1 | 10.0 | 50 | 83 | 131 | 138 | 38 | 62 |  | 84 |
| 6 | Zr | 5.0 | 0.3 g | 70 | 22 | 115 | 127 | 34 | 71 |  | 83 |
| 7 | Zr | 5.1 | 5.0 | 50 | 68 | 131 | 140 | 37 | 60 |  | 38 |
| 8 | Zr | 5.1 | 10.0 | 50 | 110 | 132 | 140 | 38 | 60 |  | 42 |
| 9 | Zr | 5.1 | 1.0 | 50 | 14 | 114 | 126 | 21 | 58 |  | 24 |
| 10 | Zr | 5.0 | 2.5 | 50 | 34 | 111 | 122 | 14 | 60 |  | 23 |
| 11 | Zr | 5.1 | 5.0 | 50 | 68 | 119 | 130 | 21 | 60 |  | 38 |
| 12 | Zr | 5.0 | 10.0 | 50 | 78 | 128 | 137 | 32 | 64 |  | 65 |
| 13 | Zr | 5.0 | 1.0 | 50 | 83 | 121 | 132 | 22 | 59 |  | 42 |
| 14 | Zr | 2.6 | 10.0 | 50 | 85 | 134 | 140 | 40 | 62 |  | 89 |
| 15 | Zr | 5.1 | 10.0 | 50 | 110 | 125 | 134 | 29 | 60 |  | 42 |
| 16 | Zr | 5.1 | 10.0 | 50 | 115 | 131 | 138 | 38 | 62 |  | 84 |
| 17 | Hf | 10.3 | 1 g | 80 | 55 | 89 | 108 |  | 223 |  | 52 |

TABLE 2

Method B

| Example | Metal | Catalyst (mg) | MAO (cc) | T (°C.) | Yield (g) | Tm1° (C.) | Tm2 (°C.) | −Hc J/g | $M_p$/1000 | $M_w/M_n$ | S.I. % |
|---|---|---|---|---|---|---|---|---|---|---|---|
| 18 | Hf | 10.0 | 10 | 50 | 58 | 116 | 125 | 24 | 644 | 5.4 |  |
| 19 | Hf | 5.0 | 10 | 50 | 60 | 117 | 124 | 24 | 774 | 4.8 |  |
| 20 | Zr | 0.6 | 10 | 50 | 162 | 134 | 140 | 40 | 69 | 1.8 | 95 |
| 21 | Zr | 1.5 | 10 | 29 | 49 | 142 | 146 | 45 | 106 | 1.9 | 95 |
| 22 | Zr | 0.6 | 10 | 70 | 119 |  | 134 | 39 | 54 | 2.0 | 95 |
| 23 | Zr | 0.2 | 10 | 50 | 27 | 135 | 140 | 39 | 69 | 1.9 |  |
| 24 | Zr | 0.6 | 10 | 50 | 162 | 134 | 140 | 40 | 69 | 1.8 |  |
| 25 | Zr | 0.6 | 10 | 25 | 26 |  | 145 | 44 | 133 | 1.9 |  |
| 26 | Zr | 0.6 | 10 | 70 | 119 |  | 134 | 39 | 54 | 2.0 |  |
| 27 | Zr | 1.5 | 10 | 29 | 49 | 142 | 146 | 45 | 106 | 1.9 |  |
| 28 | Zr | 2.5 | 10 | 50 | 141 | 135 | 141 | 40 | 70 | 1.9 |  |
| 29 | Zr | 5.0 | 10 | 28 | 152 | 128 | 137 | 43 | 88 | 2.1 |  |
| 30 | Zr | 0.5 | 10 | 60 | 185 | 128 | 137 | 37 | 52 | 1.8 |  |
| 31 | Zr | 0.5 | 5 | 70 | 158 | 120 | 134 | 36 | 55 | 2.4 |  |
| 32 | Hf | 2.5 | 10 | 70 | 96 | 103 |  | 19 | 474 | 2.6 |  |
| 33 | Hf | 10.0 | 10 | 50 | 27 | 114 |  | 26 | 777 | 5.3 |  |

TABLE 3

| | Ex. 1 | | Ex. 1A | |
|---|---|---|---|---|
| | obsd. % | calc % | obsd. % | calc % |
| % r | 95 | 95 | 98 | 98 |
| mmmm | 0.3 | 0.2 | 0 | 0 |
| mmmr | 0.3 | 0.6 | 0 | 0 |
| rmmr | 1.5 | 1.4 | 1.3 | 1.0 |
| mmrr | 2.4 | 2.9 | 1.9 | 2.1 |
| rmrr + mmrm | 1.5 | 1.6 | 0 | 0 |
| mrmr | 1.6 | 0.8 | 0 | 0 |
| rrrr | 88.0 | 89.1 | 94.7 | 94.7 |
| mrrr | 3.9 | 3.1 | 2.2 | 2.1 |
| mrrm | 0.4 | 0.4 | 0 | 0 |
| dev. |  | 0.2 |  | 0.1 |

TABLE 4

| | EX. 20 obsd. % | EX. 22 obsd. % | EX. 22-A obsd. % | EX. 33 obsd. % | EX. 33-A obsd. % |
|---|---|---|---|---|---|
| mmmm | 0 | 0.77 | 0.51 | 2.34 | 2.04 |
| mmmr | 0.23 | 0.45 | 0.31 | 0.73 | 0.76 |
| rmmr | 1.67 | 1.82 | 1.81 | 2.72 | 2.96 |
| mmrr | 3.58 | 4.25 | 4.06 | 5.72 | 6.44 |
| mrmm + rmrr | 2.27 | 3.23 | 3.57 | 2.87 | 3.12 |
| mrmr | 1.51 | 2.06 | 1.70 | 1.37 | 1.53 |
| rrrr | 82.71 | 77.58 | 78.12 | 75.7 | 74.55 |
| mrrr | 6.45 | 7.75 | 9.02 | 7.4 | 8.01 |
| mrrm | 0.68 | 0.73 | 0.93 | 1.08 | 0.55 |

The data shown in Tables 1–4 and in FIGS. 3, 4 and 5 show that the polymers of the present invention are predominantly syndiotactic polypropylene that has high crystallinity. Particularly, the NMR data shown in Tables 3 and 4 establish that the xylene insoluble fraction consists of a very high percentage of syndiotactic polymer with very little, if any, isotactic polymer being produced. Further, the syndiotactic polymer contains a high percentage of "r" groups and "rrrr" pentads indicating that there is only a small percentage of deviations from the "... rrrr ... " structure in the polymer chain. The deviations that do exist are predominantly of the "mm" type. Indeed, the results for Ex. 1-A in Table 3 show that the only deviation in the chain is of the "mm" type. The other NMR samples show the predominance of the "mm" deviation over the "m" deviation. Thus, a novel microstructure for syndiotactic polypropylene has been discovered.

The data in Tables 1–4 and Examples 1–33 show the high crystallinity of the polymer product. The relatively high melting points, TM1 and TM2, and the relatively high heats of crystallization, —Hc, indicate that the polymers are highly crystalline. This high crystallinity is demonstrated by the syndiotactic index, ([r] value) which is a measure of the per cent of racemic (r) dyads in the polymer. In Tables 1 and 2 the syndiotactic index is shown to be above 50% ([r] 0.50) in twelve of the twenty examples in which results for the syndiotactic index is recorded, eight of the twelve are 83% or above ([r]≧0.83) and four of the eight are 89% or above ([r]≧0.89). As shown in Table 3, the syndiotactic index increases upon recrystallization. The sample from Example 1 has a syndiotactic index of 62% on the polymer "as polymerized" (see Table 1). After one recrystallization, the [r] value increased to 95% and after three crystallizations the [r] value increased to 98% (see Table 3). The syndiotactic index for Examples 20–22 for the Xylene insoluble fraction from a single recrystallization from xytene were "nearly 100%" where [r] would be 1.0. Recorded values are up to 0.95. Therefore, the syndiotactic index or [r] value of the present invention ranges from about 0.50 to about 1.0, preferably from about 0.83 to about 1.0 and, most preferably, from about 0.89 to about 0.95.

Tables 3 and 4 show that there is a high percentage of [rrrr] pentads. The values ranges from 74.55 to 94.79. Therefore, the [rrrr] pentads of the present invention range from about 0.75 to about 0.95. The median is about 0.85 and the mean average is about 81.6 with a standard deviation of 6.83.

The data further indicates a correlation between the polymerization reaction temperature, T, and the melting points, molecular weights and the heats of crystallization of the polymer. As the reaction temperature increases, all three of these properties decrease. There also seems to be a range of temperature within which the yield of polymer is maximized. This reaction temperature range will vary with the type of catalyst used but is typically 50°–70° C. The concentration of methylalumoxane (MAO) also appears to affect the polymer yield. The data indicates that to a point, the greater the concentration of MAO, the higher the yield of polymer. The concentration of MAO also seem to have some effect on the amount of atactic polymer produced. MAO appears to act like a scavenger for impurities and tends to reduce the amount of atactic polymer produced.

The data further indicates a difference between the zirconium catalyst and the hafnium catalyst of the present invention. The polymers produced with the hafnium catalysts tend to be less crystalline and have lower melting points than the polymers produced with the zirconium catalysts. The data in Table 4 also shows that the hafnium catalyst produces a higher percentage of isotactic blocks in the polymer chain as reflected by the presence of the isotactic pentad mmmm.

Examples 18, 19 and 33 show the ability to achieve a broader molecular weight distribution, $MWD=M_w/M_n$, by use of a mixture of the catalysts described by the present invention. The catalysts in these Examples were prepared using $HfCl_4$ that contained about 4% $ZrCl_4$. Therefore, both isopropyl (fluorenyl)(cyclopentadienyl) hafnium dichloride and isopropyl (fluorenyl)(cyclopentadienyl) zirconium dichloride were produced. The MWD of the polymer in these Examples with a mixture of two catalysts is significantly higher than the MWD of the polymer produced by an essentially pure hafnium catalyst—see Example 32. Thus, a mixture of two different catalysts can be used to produce a polymer with a broad MWD.

It should be further understood that the syndio-specific catalyst of the present invention are not limited to the specific structures recited in the Examples, but rather, include catalysts described by the general formula given herein in which $C_5R_4$ is substituted in such a manner as to have bi-lateral or pseudo bi-lateral symmetry as described above.

From the detailed description of the invention just given, it is apparent that the invention provides a novel structure of syndiotactic polypropylene. Having described but a few embodiments, it will be apparent to one skilled in the art that various modifications and adaptations may be made to the polymers as described without departing from the scope of the present invention.

What is claimed as new and desired to be secured by letter of patent of the United States is:

1. Syndiotactic polypropylene having a value greater than or equal to 0.83.

2. Syndiotactic polypropylene as in claim 1 having a value greater than or equal to 0.89.

3. Syndiotactic polypropylene having a value from about 0.75 to 0.95.

4. Syndiotactic polypropylene as in claim 3 having a value from 0.757 to 0.88.

* * * * *

UNITED STATES PATENT AND TRADEMARK OFFICE
CERTIFICATE OF CORRECTION

PATENT NO.   :   5,476,914
DATED        :   December 19, 1995
INVENTOR(S)  :   John A. Ewen; Abbas Razavi It is certified that error appears in the above-identified patent and that said Letters Patent is hereby corrected as shown below:

Column 14, lines 40-49:
What is claimed as new and desired to be secured by letter of patent of The United States is:

Syndiotactic polypropylene having a "r" value greater than or equal to 0.83.

Syndiotactic polypropylene as in Claim 1 having a "r" value greater than or equal to 0.89.

Syndiotactic polypropylene having a "rrrr" value from about 0.75 to 0.95.

Syndiotactic polypropylene as in Claim 3 having a "rrrr" value from 0.757 to 0.88.

Signed and Sealed this

Twenty-sixth Day of March, 1996

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,476,914 Page 1 of 1
DATED : December 19, 1995
INVENTOR(S) : John A. Ewen and Abbas Razavi It is certified that error appears in the above-identified patent and that said Letters Patent is hereby corrected as shown below:

<u>Title page,</u>
Item [75], should read:
-- Inventors: Abbas Razavi, Paturages, Belgium; John A. Ewen, Houston, Tex. --.

Signed and Sealed this

Fifteenth Day of November, 2005

JON W. DUDAS
*Director of the United States Patent and Trademark Office*